United States Patent
Shen et al.

(10) Patent No.: US 10,153,834 B2
(45) Date of Patent: Dec. 11, 2018

(54) OPTICAL FIBER REPLACEMENT METHOD IN OPTICAL NETWORK

(71) Applicant: SOOCHOW UNIVERSITY, Suzhou, Jiangsu (CN)

(72) Inventors: Gangxiang Shen, Jiangsu (CN); Yanxin Guan, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/447,197

(22) Filed: Mar. 2, 2017

(65) Prior Publication Data

US 2018/0138972 A1   May 17, 2018

(30) Foreign Application Priority Data

Nov. 15, 2016 (CN) .......................... 2016 1 1004786

(51) Int. Cl.

| | |
|---|---|
| G01N 21/00 | (2006.01) |
| H04B 10/077 | (2013.01) |
| H04B 10/073 | (2013.01) |
| H04B 10/27 | (2013.01) |
| H04J 14/02 | (2006.01) |

(52) U.S. Cl.
CPC ....... *H04B 10/0773* (2013.01); *H04B 10/073* (2013.01); *H04B 10/27* (2013.01); *H04J 14/0267* (2013.01)

(58) Field of Classification Search
CPC .......... G01M 11/3145; G01M 11/335; G01M 11/33; G01M 11/3109; G01M 11/338
USPC ........................................................ 356/73.1
See application file for complete search history.

(56) References Cited

U.S. PATENT DOCUMENTS

| | | | |
|---|---|---|---|
| 6,952,529 B1* | 10/2005 | Mittal .............. | H04B 10/07953 398/25 |
| 8,712,237 B2* | 4/2014 | Jenkins ................ | H04B 10/275 398/140 |
| 8,891,382 B2* | 11/2014 | Lee .......................... | H04L 45/62 370/248 |
| 2010/0040364 A1* | 2/2010 | Jenkins .................. | H04B 10/27 398/26 |
| 2013/0010612 A1* | 1/2013 | Lee .......................... | H04L 45/62 370/248 |

\* cited by examiner

*Primary Examiner* — Md M Rahman
(74) *Attorney, Agent, or Firm* — SZDC Law P.C.

(57) ABSTRACT

An optical fiber replacement method in an optical network is provided. The optical fiber replacement method in the optical network is based on blocking due to an optical signal noise ratio limitation, in which standard single-mode optical fibers in an existing optical network are gradually replaced with ultra-low loss optical fibers. With the optical replacement method in the optical network, performance of the optical network can be improved to the greatest extent while ensuring low replacement cost in a process of gradually replacing the optical fibers.

9 Claims, 7 Drawing Sheets

| Modulation format | Standard frequency capacity (Gb/sec) | Threshold of optical signal noise ratio (dB) |
|---|---|---|
| BPSK | 25 | 14.03 |
| QPSK | 50 | 17.01 |
| 8-QAM | 75 | 20.37 |
| 16-QAM | 90 | 22.4 |

OPTICAL FIBER REPLACEMENT METHOD IN OPTICAL NETWORK

CROSS REFERENCE TO RELATED APPLICATION

The present application claims the priority to Chinese Patent Application No. 201611004786.X, titled "OPTICAL FIBER REPLACEMENT METHOD IN OPTICAL NETWORK", filed on Nov. 15, 2016 with the State Intellectual Property Office of People's Republic of China, which is incorporated herein by reference in its entirety.

FIELD

The present disclosure relates to the field of optical communication, and in particular to an optical fiber replacement method in an optical network.

BACKGROUND

With continuous development and wide application of optical information technology, requirements for network traffic in various fields are growing. With continuous improvement of fiber optic network, how to achieve high-bandwidth long-distance information transmission of the optical fiber becomes a crucial problem in the field of information technology. A key to solve the problem is to improve an optical signal noise ratio in a fiber optic network system, and one of effective methods for improving the optical signal noise ratio is to replace an ordinary standard single-mode optical fiber with an ultra-low loss optical fiber. A loss of the optical fiber is caused by an impurity in its material. The loss can be reduced if content of the impurity in the material is reduced, which also leads to an increased transmission speed and a prolonged transmission distance. The number of signal regenerators for establishing an optical network can be reduced if the transmission distance is increased, thereby effectively reducing cost of establishing the optical network. For the above reasons, there are many studies on optical fiber characteristics and transmission performances of the ultra-low loss optical fiber currently. An SMF-28® ultra-low loss optical fiber produced by Corning Corporation and a Farband™ ultra fiber produced by Changfei Corporation are in commercial use. However, the ultra-low loss optical fiber has a greater development difficulty than an ordinary optical fiber or low loss optical fiber. Since the ultra-low loss optical fiber has a different section structure and a different manufacturing process, a development cycle is required for R&D staff to redesign a section structure and develop a new manufacturing process, thereby increasing the cost. Production and processing cost of the ultra-low loss optical fiber is also higher than that of the ordinary single-mode optical fiber, and an ultra-low loss optical fiber having an attenuation coefficient closer to a theoretical limit is more expensive.

For a large-scale optical network, it is unsuitable in terms of technique and cost to replace all standard single-mode optical fibers with the ultra-low loss optical fibers in a one-time step. The network operator prefers to gradually replacing the standard single-mode optical fiber in the existing optical network with the ultra-low loss optical fiber in a life cycle of the original optical fiber. Based on the foregoing, a study on an optical fiber replacement method for the optical network is lacked in the art, that is, a replaced optical fiber is not effectively selected according to the traffic load distribution and operational status of an optical network, thereby resulting in poor performance improvement of the optical network and a high cost for replacing optical fibers.

SUMMARY

In view of this, an objective of the present disclosure is to provide an optical fiber replacement method in an optical network, in which based on lightpath service blocking due to an optical signal noise ratio limitation, standard single-mode optical fibers in an existing optical network are replaced with ultra-low loss optical fibers gradually. With the optical fiber replacement method in the optical network, performance of the optical network is improved to the greatest extent while ensuring low replacement cost in a process of gradually replacing the optical fibers.

An optical fiber replacement method in an optical network is provided based on the objective of the present disclosure, which includes: A, providing a blocking counter having an initialization value equal to 0 for each link in the optical network; B, performing dynamic simulation on an optical network in which no optical fiber is replaced, by using an optical signal noise ratio adaptive algorithm; C, in a case that a request in the optical network is blocked due to an optical signal noise ratio limitation, searching for a shortest path between a pair of nodes for the blocked request based on a physical topology of the optical network; D, increasing, by one, a blocking value of each of links passed through by the shortest path between the pair of nodes for the blocked request; and E, replacing, with an ultra-low loss optical fiber, an ordinary single-mode optical fiber of a link having the greatest blocking value due to the optical signal noise ratio limitation.

Preferably, the optical signal noise ratio adaptive algorithm in step B includes: B1, determining the number of frequency slots for each modulation format based on a bandwidth required by traffic, and setting a first modulation format as a current modulation format; B2, creating a sequence of spectral windows based on the current modulation format, and removing a link which does not meet a requirement of a spectral window from a corresponding spectral window plane; and B3, searching for a path based on the spectral window plane.

Preferably, step B3 is followed by step B4, and step B3 includes: searching, based on the number of hops, for a shortest path on the spectral window plane by using the Dijkstra's algorithm; and performing step B4 if each spectral window plane is found with a path.

Preferably, step B3 is followed by step B5, and step B3 includes: searching, based on the number of hops, for a shortest path on the spectral window plane by using the Dijkstra's algorithm; and performing step B5 if not each spectral window plane is found with a path.

Preferably, step B4 includes: checking whether each path in step B3 meets a requirement of a threshold of the optical signal noise ratio in the current modulation format; and removing the path if the path does not meet the requirement.

Preferably, step B4 includes: checking whether each path in step B3 meets a requirement of a threshold of the optical signal noise ratio in the current modulation format; and if multiple paths meet the requirement of the threshold of the optical signal noise ratio in the current modulation format, comparing the numbers of hops of the multiple paths and selecting a path having the minimum number of hops to establish a lightpath.

Preferably, step B4 is followed by step B5, and step B4 includes: checking whether each path in step B3 meets a requirement of a threshold of the optical signal noise ratio in the current modulation format; and performing step B5 if no path meets the requirement.

Preferably, step B5 includes: determining whether the current modulation format is the last modulation format; and blocking the current request if the current modulation format is the last modulation format.

Preferably, step B5 includes: determining whether the current modulation format is the last modulation format; and if the current modulation format is not the last modulation format, setting a next modulation format as the current modulation format and performing step B2.

Preferably, a loss coefficient of the ultra-low loss optical fiber is assumed to range from 0.168 dB/km to 0.17 dB/km.

Compared with the conventional technology, the optical fiber replacement method in the optical network according to the present disclosure has advantages as follows: performance of the optical network can be improved to the greatest extent while ensuring low replacement cost in a process of gradually replacing the optical fibers.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Apparently, the drawings in the following description are only some embodiments of the present disclosure. For those skilled in the art, other drawings can also be obtained according to the drawings without any creative work.

DETAILED DESCRIPTION OF EMBODIMENTS

Figure 1:
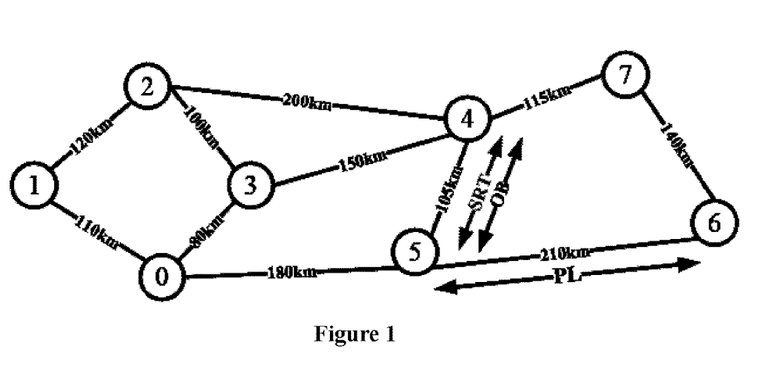
FIG. 1 is a schematic structural diagram of a typical optical network.

FIG. 1 is a schematic structural diagram of a typical optical network, the optical network in FIG. 1 includes eight nodes from node 0 to node 7, and links are formed between nodes through optical fibers according to needs. A large-scale optical network is composed of multiple nodes and links. The work for replacing all optical fibers in the optical network in a one-time step is expensive and time-consuming. Furthermore, since the whole optical network is in a disabled state when replacing the optical fibers, it is unavoidable to affect users of the optical network. For the above reasons, the operator normally replaces standard single-mode optical fibers with ultra-low loss optical fibers gradually. FIG. 1 shows three replacement methods.

A first replacement method is based on a physical length (abbreviated and illustrated as PL), in which all optical fiber links in the optical network are ranked based on the physical length of the optical fiber links, and an optical fiber link with a longer distance is replaced preferentially. The first replacement method is on the basis of the theory that the attenuation is greater if the transmission distance of an optical signal in the optical fiber is longer. By replacing an ordinary single-mode optical fiber in a longer link with an ultra-low loss optical fiber, attenuation of the signal in the optical network can be reduced effectively. As shown in FIG. 1, a link (5-6) has a longest physical length. Therefore, an optical fiber of the link (5-6) is replaced first in the first replacement method.

A second replacement method is based on a shortest routing tree (abbreviated and illustrated as SRT), in which a shortest path (i.e. a physical length) between each pair of nodes is found with a shortest path algorithm. For each of the links, the number of paths which pass through the link is calculated, and all of the links are ranked based on the number of paths which pass through the link. A link having the greatest number of being passed through by the shortest paths is selected to be replaced preferentially. The second replacement method is on the basis of the theory that a greater number of a link being passed through by the shortest paths indicates greater communication traffic of the link. By replacing an ordinary single-mode optical fiber of the link with an ultra-low loss optical fiber, the overall performance of the optical network can be improved effectively. As shown in FIG. 1, a link (4-5) has the greatest number of being passed through by the shortest paths, and therefore, an optical fiber of the link (4-5) is replaced first in the second replacement method.

A third replacement method is based on blocking (OSNR Blocking, abbreviated and illustrated as OB) due to an optical signal noise ratio (abbreviated as OSNR), in which a blocking counter having an initialization value equal to 0 is provided for each link, and a dynamic simulation is performed on a network deployed with only standard single-mode optical fibers by using a routing and wavelength assignment (abbreviated as RSA) algorithm. In a case that a request in the optical network is blocked due to an optical signal noise ratio limitation, a shortest path between a pair of nodes for the blocked request is found based on a physical topology of the optical network, and an blocking value of each of links passed through by the shortest path is increased by one. If a lightpath passes through a link having a great blocking value, it is very possible for the lightpath to be blocked due to an optical signal noise ratio limitation. Therefore, the link having a great blocking value is a bottleneck for improving performance of the optical network. In order to reduce blocking of the lightpath, the link having the great blocking value needs to be replaced preferentially. As shown in FIG. 1, since that the link (4-5) has the greatest blocking value, the link (4-5) is replaced first in the third replacement method.

Among the above three methods, the third replacement method of replacing the optical fiber based on the blocking due to the optical signal noise ratio can improves performance of the optical network to the greatest extent, and therefore is adopted in the present disclosure.

Figure 2:
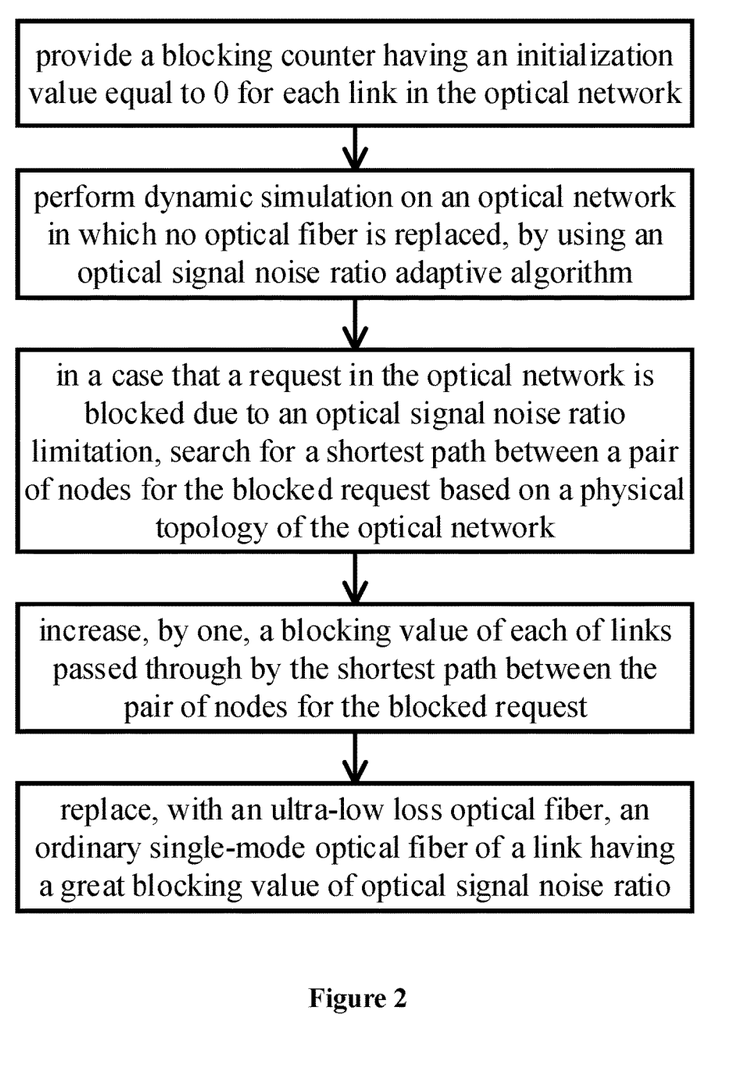
FIG. 2 is a schematic flow chart of an optical fiber replacement method performed based on blocking due to an optical signal noise ratio limitation.

The third replacement method is shown in FIG. 2, which is a schematic flow chart of an optical fiber replacement method based on blocking due to the optical signal noise ratio. The optical fiber replacement method includes steps A to E.

In step A, a blocking counter having an initialization value equal to 0 is provided for each of links in an optical network.

In step B, dynamic simulation is performed on the optical network in which no optical fiber is replaced, by using an optical signal noise ratio adaptive algorithm.

In step C, in a case that a request in the optical network is blocked due to an optical signal noise ratio limitation, a shortest path between a pair of nodes for the blocked request is searched for based on a physical topology of the optical network.

In step D, a blocking value of each of links passed through by the shortest path between the pair of nodes for the blocked request is increased by one.

In step E, an ordinary single-mode optical fiber in the link having the greatest blocking value due to the optical signal noise ratio limitation is replaced with an ultra-low loss optical fiber.

In replacing the standard single-mode optical fiber in the optical network with the ultra-low loss optical fiber, positions of all devices in the optical network are unchanged. For example, if a distance between optical amplifiers in the optical network is 80 km, positions of the optical amplifiers are unchanged in replacing the optical fiber. In addition to the optical amplifiers arranged every 80 km in the link of the optical network, a pre-amplifier and a post-amplifier are arranged at two ends of the link, respectively. Based on the above structure, an optical signal noise ratio of each lightpath in the optical network is calculated according to a formula as follows.

$$\frac{1}{OSNR_{total}} = \sum_{s \in L} \frac{1}{OSNR_s} = \sum_{s \in L} 1 / \left(1 / \sum_{i \in A^s} 10^{P_{Ase}^{s,i}/10}\right) = \sum_{s \in L} 1 / \left(1 / \sum_{i \in A^s} 10^{(-58+G_s^i+NF_s^i)/10}\right)$$

Specifically, optical power of each amplifier is assumed to be a constant. $OSNR_{total}$ denotes a total optical signal noise ratio of a lightpath (without considering additional loss caused by nonlinearity). L denotes a set of links of a current lightpath, $A^s$ denotes a set of amplifiers in link s, $OSNR_s$ denotes an optical signal noise ratio of an s-th link of the lightpath. For each link s, $P_{Ase}^{s,i}$ (dBm) denotes power of amplifier spontaneous emission noise (abbreviated as ASE) caused by an i-th amplifier on a spectrum of 0.1 nm, $G_s^i$ (dB) denotes a gain of the i-th amplifier, $NF_s^i$ (dB) denotes a noise index of the i-th amplifier under the current gain. $OSNR_{total}$ and $OSNR_s$ are of linear values. By replacing with a new-type ultra-low loss optical fiber, a gain of the amplifiers arranged every 80 km is reduced significantly. In this case, noise of the amplifier can be reduced, and therefore the optical signal noise ratio of the link can be improved. It should be noted that the optical signal noise ratio is calculated by only considering the loss of the optical fiber and the noise of the amplifier. An effect on the optical signal noise ratio caused by an amplifier spontaneous emission noise factor generated by other non-amplifier is estimated to be 2.5 dB.

Figure 3:
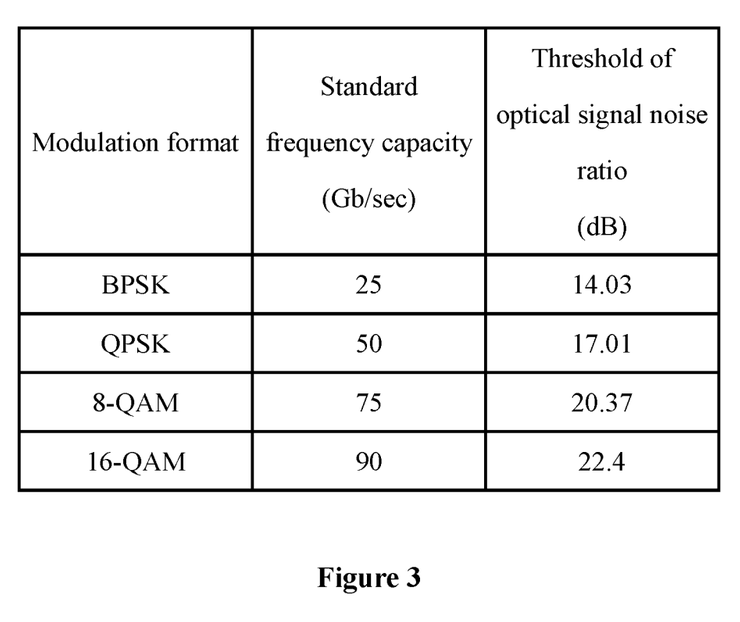
FIG. 3 is a table of modulation formats.
Figure 4:
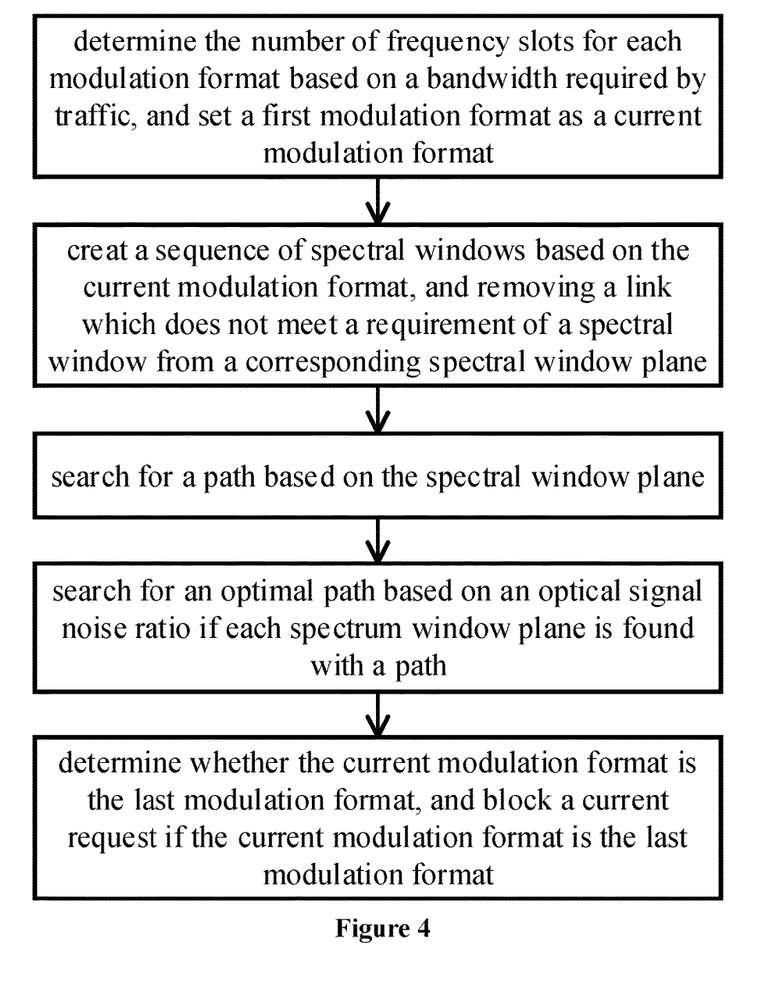
FIG. 4 is schematic flow chart of an optical signal noise ratio adaptive algorithm.

FIG. 4 is a schematic flow chart of an optical signal noise ratio adaptive algorithm adopted in an optical fiber replacement method in an optical network according to the present disclosure. The optical signal noise ratio adaptive algorithm is based on a routing and wavelength assignment (RSA) algorithm. In addition to searching different spectrum windows for sufficient spectrum window resources, it is further estimated whether an optical signal noise ratio of a founded path meets a requirement of a threshold in a specified modulation format. FIG. 3 shows standard frequency capacities and thresholds of optical signal noise ratio corresponding to different modulation formats. In the optical signal noise ratio adaptive algorithm, a highest modulation format is attempted first, and a path having the minimum number of hops is selected from all qualified paths in different spectrum window planes, to establish a lightpath, thereby maximizing a utilization ratio of the network spectrum resources. The optical signal noise ratio adaptive algorithm includes steps B1 to B5.

In step B1, the number of frequency slots for each modulation format is determined based on a bandwidth required by traffic, and a first modulation format is set as a current modulation format.

In step B2, a sequence of spectrum windows is created based on the current modulation format, and a link which does not meet a requirement of a spectrum window is removed from a corresponding spectrum window plane.

In step B3, a path is searched for based on the spectrum window plane.

In step B4, if each spectral window plane is found with a path, an optimum path is searched for based on an optical signal noise ratio.

In step B5, it is determined whether the current modulation format is the last modulation format, and the current request is blocked if the current modulation format is the last modulation format.

Specifically, step B3 includes: searching, based on the number of hops, for a shortest path on the spectral window plane by using Dijkstra's algorithm; performing step B4 if each spectral window plane is found with a path, and performing step B5 if not each spectral window plane is found with a path.

Step B4 specifically includes: checking whether each path in step B3 meets a requirement of a threshold of the optical signal noise ratio in the current modulation format; removing the path if the path does not meet the requirement; and if multiple paths meet the requirement of the threshold of the optical signal noise ratio, comparing the numbers of hops of the multiple paths and selecting a path having the minimum number of hops to establish a lightpath; and performing step B5 if no path meets the requirement.

Step B5 includes: determining whether the current modulation format is the last modulation format; blocking the current request if the current modulation format is the last modulation format, and setting a next modulation format in a table as the current modulation format and performing step B2 if the current modulation format is not the last modulation format.

In order to demonstrate the good performance of the optical fiber replacement method in the optical network according to the present disclosure, i.e. the method based on the blocking due to the optical signal noise ratio (OB), the three solutions described above are compared below. A NSFNET network including 14 nodes and 21 links and a USNET network including 24 nodes and 43 links are selected as test networks, to test a dynamic traffic requirement having an arrival in the Poisson distribution, a duration time in a negative exponential distribution, and a bandwidth of each service request distributed randomly between 10 Gb/s and 400 Gb/s. A bandwidth blocking probability (abbreviated as BBP) is an important estimation criteria for the performance of the optical network. The bandwidth blocking probability is defined as a ratio of a total blocking bandwidth to a total service bandwidth. In order to calculate the bandwidth blocking probability, $10^6$ service requests are simulated in the test. 320 frequency slots are provided for each optical fiber link in the whole network. A bandwidth of each frequency slot is set to be 12.5 GHz. In addition, four modulation formats, such as BPSK, QPSK, 8-QAM and 16-QAM, are considered.

Figure 5:
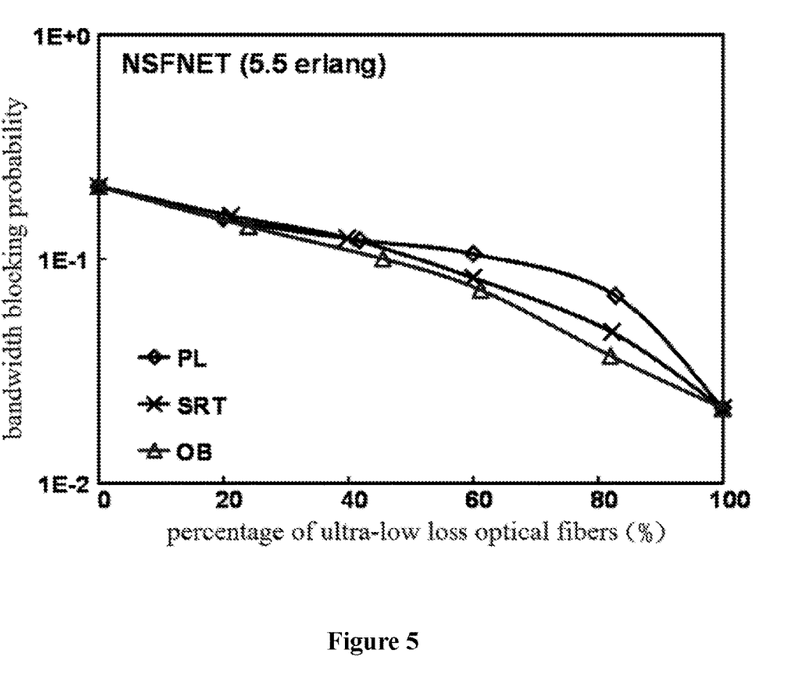
FIG. 5 is a schematic diagram showing changing of a bandwidth blocking probability with a percentage of replacing with an ultra-low loss optical fibers in a NSFNET network.

FIG. 5 is a schematic diagram showing changing of the bandwidth blocking probability in the NEFNET network with a percentage of replacing with the ultra-low loss optical fiber. The SMF-28® ultra-low loss optical fiber produced by Corning Corporation and having an attenuation coefficient of 0.168 dB/km is used here. Comparing a network fully deployed with standard single-mode optical fibers and a network fully replaced with ultra-low loss optical fibers, it can be found that a bandwidth blocking probability is reduced from 0.211 to 0.0216. Comparing the three optical fiber replacement methods described above, it can be found that the method based on the blocking due to the optical signal noise ratio is the best, which considers the bottleneck of the optical signal noise ratio of a lightpath instead of the number of shortest paths of each link. Among the three methods, the method based on the shortest path has medium performance, and the method based on the physical length has the lowest performance because only a physical length of each link is simply considered.

Figure 6:
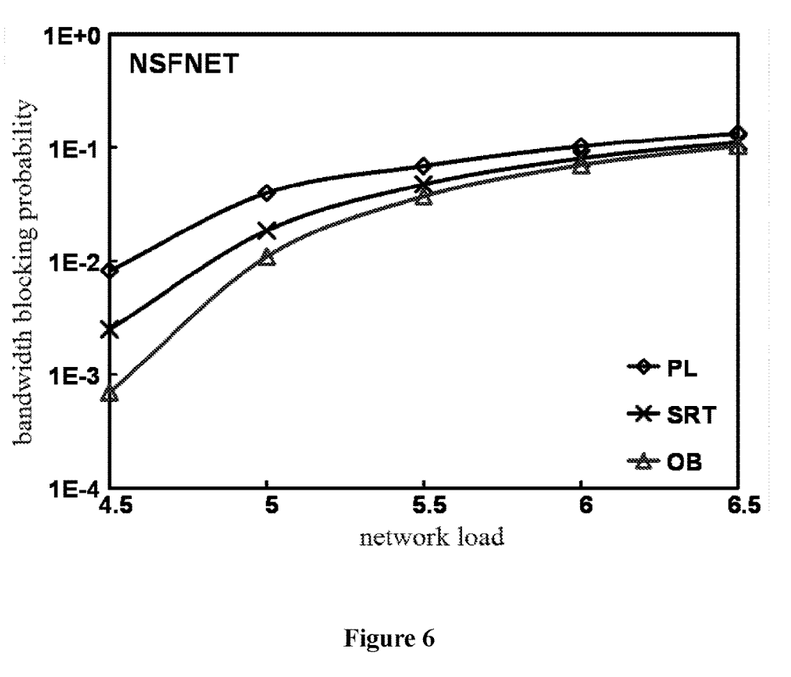
FIG. 6 is a schematic diagram showing changing of a bandwidth blocking probability with network load in a NSFNET network in a case that 80% of optical fibers are replaced with ultra-low loss optical fibers.

FIG. 6 is a schematic diagram of comparing the three methods in a case that 80% of optical fibers are replaced with ultra-low loss optical fibers. Although bandwidth blocking probabilities are increased gradually with increase of network load in the three methods, the method based on the blocking due to the optical signal noise ratio has highest performance among the three methods, the method based on the physical length has the lowest performance, and the method based on the shortest path has medium performance.

Figure 7:
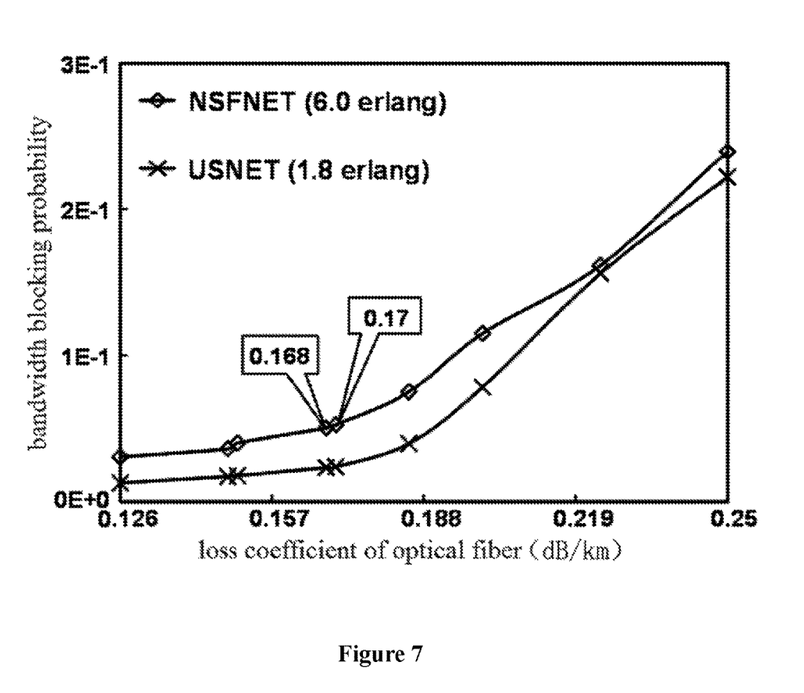
FIG. 7 is a schematic diagram showing changing of a bandwidth blocking probability with a loss coefficient of an optical fiber in a case that all of optical fibers are replaced with ultra-low loss optical fibers.

FIG. 7 is a schematic diagram showing changing of a bandwidth blocking probability with a loss coefficient of an optical fiber in a case that all the optical fibers are replaced with the ultra-low loss optical fibers. It takes a great challenge and high cost to replace with an optical fiber having a lower loss coefficient. Although the bandwidth blocking probability is decreased significantly with the decrease of loss coefficient, the bandwidth blocking probability is not further decreased significantly with the decrease of loss coefficient after the loss coefficient is decreased to a certain value (approximating to 0.168 dB/km). Therefore, it is unnecessary to decrease the loss coefficient of the ultra-low loss optical fiber to a theoretical limit (0.146 dB/km), and the ultra-low loss optical fiber having a loss coefficient ranging from 0.168 dB/km to 0.17 dB/km is sufficient for improving blocking performance of the network.

In summary, a measurement result indicates that the performance of the bandwidth blocking probability can be improved effectively by replacing with ultra-low loss optical fibers in the optical network, and the network performance can be improved best by the optical fiber replacement method based on the blocking due to the optical signal noise ratio. In addition, in order to reduce the high production cost, it is unnecessary to decrease the loss coefficient of the ultra-low loss optical fiber to the theoretical lowest threshold of the loss coefficient of the optical fiber. More importantly, comparing with the optical fiber having the loss coefficient equal to a theoretical lowest threshold, the ultra-low loss optical fiber having the loss coefficient ranging from 0.168 dB/km to 0.17 dB/km is sufficient for improving the performance of the bandwidth blocking probability.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. An optical fiber replacement method in an optical network, wherein the optical network comprises a plurality of nodes, a plurality of links formed between two of the plurality of nodes through optical fibers, a pre-amplifier and a post-amplifier are arranged at two ends of each link of the plurality of links and a plurality of optical amplifiers; comprising:

A, providing a blocking counter having an initialization value equal to 0 for each link in the optical network;

B, performing dynamic simulation on the optical network in which no optical fiber is replaced, by using an optical signal noise ratio adaptive algorithm;

wherein a total optical signal noise ratio of each lightpath in the optical network is calculated according to a formula:

$$\frac{1}{OSNR_{total}} = \sum_{s \in L} \frac{1}{OSNR_s} = \sum_{s \in L} 1 \Big/ \left(1 \Big/ \sum_{i \in A^s} 10^{P_{Ase}^{s,i}/10}\right) = \sum_{s \in L} 1 \Big/ \left(1 \Big/ \sum_{i \in A^s} 10^{(-58+G_s^i+NF_s^i)/10}\right)$$

wherein OSNRtotal is the total optical signal noise ratio of a lightpath; L is a set of links of the lightpath, As is a set of optical amplifiers in an s-th link among the set of links, OSNRs is an optical signal noise ratio of the s-th link; wherein for the s-th link, is power of optical amplifier spontaneous emission noise caused by an i-th optical amplifier on a spectrum of 0.1 nm, Gis(dB) is a gain of the i-th optical amplifier, NFis is a noise index of the i-th optical amplifier under the current gain;

C, searching for a shortest path between a pair of nodes for a blocked request based on a physical topology of the optical network, in a case that the request is blocked in the optical network based on the total optical signal noise ratio and an optical signal noise ratio limitation;

D, increasing, by one, a blocking value of each of links which is passed through by the shortest path; and E, determining, among the plurality of links, a link having a greatest blocking value, and replacing, an original optical fiber of the determined link having the greatest blocking value with a new optical fiber having an ultra-low loss, wherein positions of all other devices except the replaced optical fiber in the optical network are unchanged after the replacing.

2. The optical fiber replacement method in the optical network according to claim 1, wherein the optical signal noise ratio adaptive algorithm in step B comprises:

B1, determining the number of frequency slots for each modulation format based on a bandwidth required by traffic, and setting a first modulation format as a current modulation format;

B2, creating a sequence of spectral windows based on the current modulation format, and removing a link which does not meet a requirement of a spectral window from a corresponding spectral window plane; and B3, searching for a path based on the spectral window plane.

3. The optical fiber replacement method in the optical network according to claim 2, wherein step B3 comprises:

searching, based on the number of hops, for a shortest path on the spectral window plane by using Dijkstra's algorithm.

4. The optical fiber replacement method in the optical network according to claim 3, further comprising:

B4: checking whether each path in step B3 meets a requirement of a threshold of the optical signal noise ratio in the current modulation format, if each spectral window plane is found with a path in step B3; and determining whether the current modulation format is the last modulation format if not each spectral window plane is found with a path in step B3.

5. The optical fiber replacement method in the optical network according to claim 4, further comprising:

removing the path if the path does not meet the requirement in step B4;

comparing the numbers of hops of a plurality of paths and selecting a path having the minimum number of hops to establish a lightpath, if the plurality of paths meet the requirement of the threshold of the optical signal noise ratio in the current modulation format in step B4; and determining whether the current modulation format is the last modulation format if no path meets the requirement in step B4.

6. The optical fiber replacement method in the optical network according to claim 5, further comprising:

blocking a current request if the current modulation format is the last modulation format; and setting a next modulation format as the current modulation format and performing step B2, if the current modulation format is not the last modulation format.

7. The optical fiber replacement method in the optical network according to claim 4, further comprising:

blocking a current request if the current modulation format is the last modulation format; and setting a next modulation format as the current modulation format and performing step B2, if the current modulation format is not the last modulation format.

8. The optical fiber replacement method in the optical network according to claim 2, wherein the modulation format is one of BPSK, QPSK, 8-QAM and 16-QAM.

9. The optical fiber replacement method in the optical network according to claim 1, wherein a loss coefficient of the ultra-low loss optical fiber ranges from 0.168 dB/km to 0.17 dB/km.

* * * * *